United States Patent [19]

Kaniut

[11] 4,008,867
[45] Feb. 22, 1977

[54] AIRCRAFT WITH SAFETY TAIL UNIT

[76] Inventor: Herbert M. Kaniut, Orrerweg 33/35, 5000 Cologne 71, Germany

[22] Filed: Dec. 15, 1975

[21] Appl. No.: 633,994

Related U.S. Application Data

[63] Continuation-in-part of Ser. No. 508,319, Dec. 4, 1974, abandoned.

[30] Foreign Application Priority Data

Aug. 16, 1974 Germany .................... 2439479

[52] U.S. Cl. .................................. 244/87; 244/43
[51] Int. Cl.² ........................................ B64C 5/02
[58] Field of Search ............. 244/13, 15, 43, 45 R, 244/45 A, 87, 89, 48, 46; D12/71, 76

[56] References Cited

UNITED STATES PATENTS

| 1,916,813 | 7/1933 | Sessa | 244/46 |
|---|---|---|---|
| 2,376,636 | 5/1945 | Thompson | 244/43 |
| 2,941,752 | 6/1960 | Gluhareff | 244/46 |
| 3,181,820 | 5/1965 | Burnelli | 244/87 |
| 3,478,989 | 11/1969 | Bielefeldt | 244/43 |
| 3,493,197 | 2/1970 | Spearman | 244/87 |
| 3,902,686 | 9/1975 | Wykes et al. | 244/45 A |

Primary Examiner—Trygve M. Blix
Assistant Examiner—Galen L. Barefoot

[57] ABSTRACT

Aircraft having supersonic and subsonic flight capabilities which utilize variable geometry tail units and fixed front planes to generally improve airworthiness and safety of aircraft during takeoff and landing, and which additionally have a reduced air resistance during high-speed flight and thus save propulsion energy.

11 Claims, 9 Drawing Figures

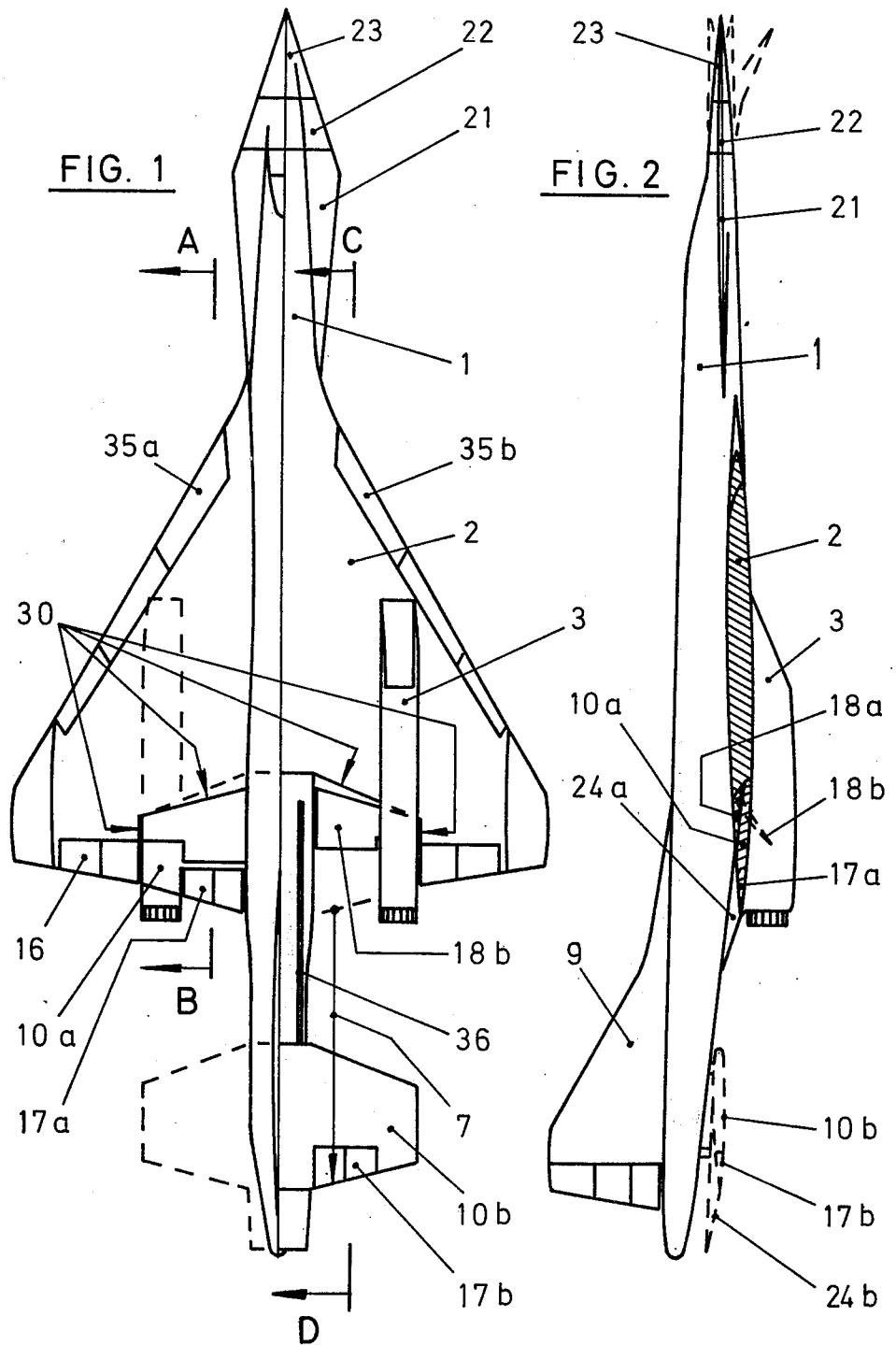

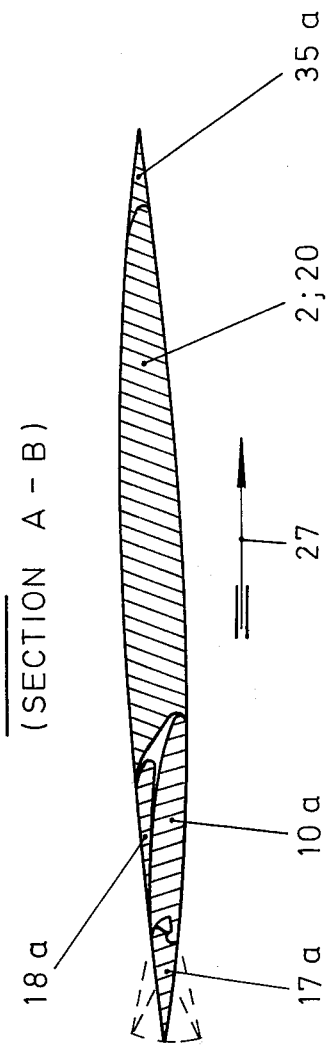
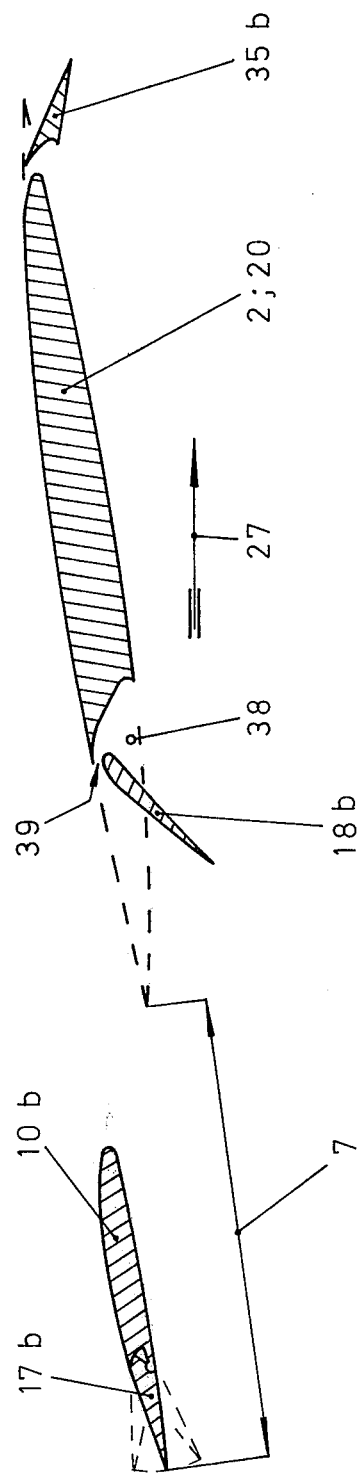

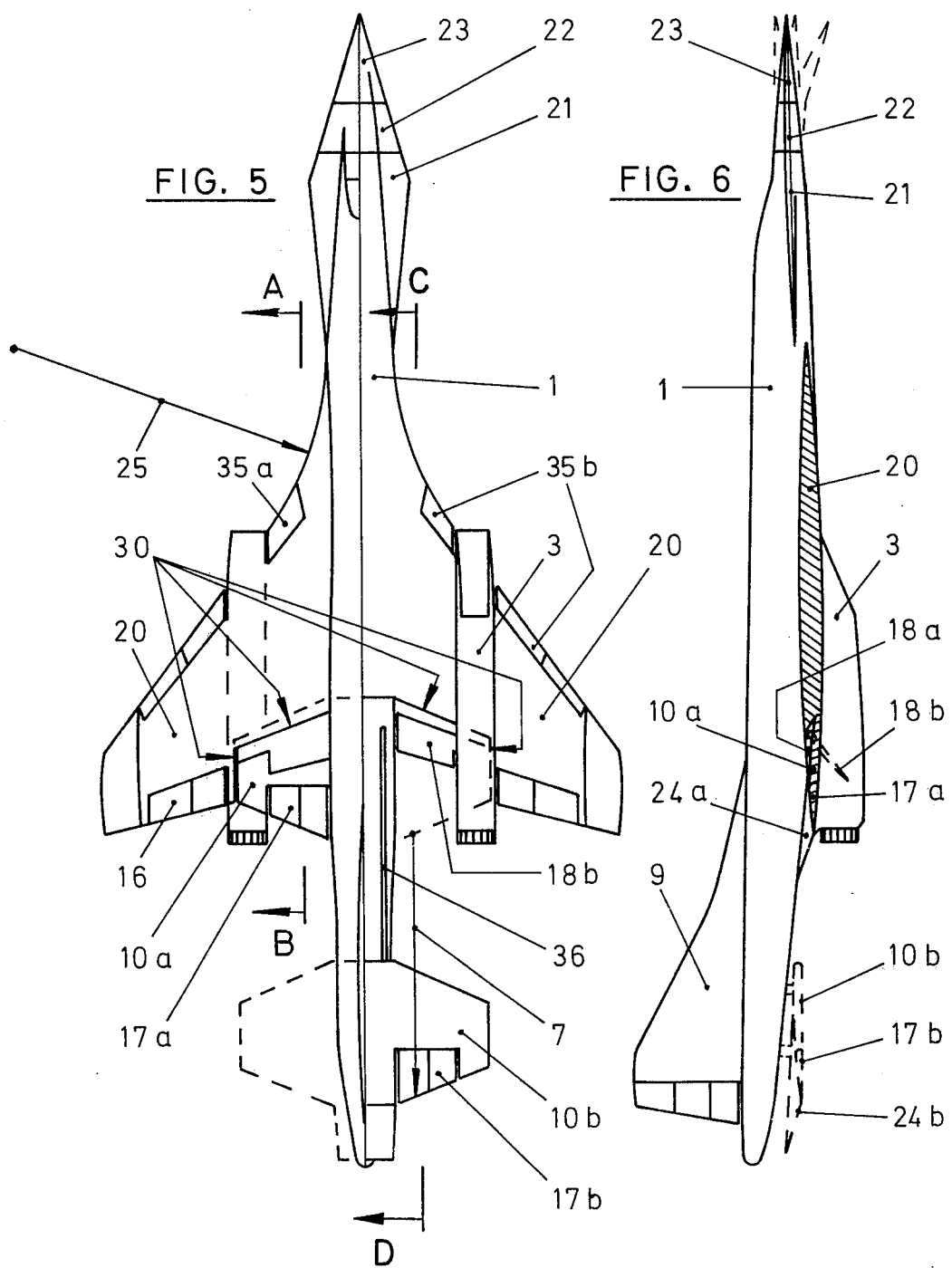

(SECTION E-F)

AIRCRAFT WITH SAFETY TAIL UNIT

This is a continuation-in-part application of Ser. No. 508,319 filed Dec. 4, 1974 and now abandoned.

BACKGROUND AND SUMMARY OF THE INVENTION

This invention relates generally to aerial vehicles, and relates with particularity to subsonic and supersonic aircraft having an improved safety during takeoff and landing operations and having a reduced supersonic impact wave resistance combined with a better maneuverability. One of the major problems associated with the design of modern fast aircraft is to achieve a satisfactory stability and control of aircraft during low-speed flight. This depends upon the continuously reduced longitudinal distance between the wing and the horizontal tail, which as the final configuration results in the unification of both planes in the one-piece delta-wing. By this process the low-speed flight longitudinal stability and control of the aircraft become worse and worse, and airworthiness and flight safety particularly during takeoff and landing will decrease. If considering improvement possibilities, we first of all have to take the opposite way which is again to increase the longitudinal distance between the wing and the horizontal tail. But since this increased distance is not desirable during high-speed flight, it can be provided temporary and for low-speed flight only. Thus a variable geometry tail unit is brought forth.

In this respect a translating horizontal tail has already been proposed for supersonic aircraft with the primary purpose to counteract the variation of longitudinal stability and control with Mach number. But this proposal was of a general nature only, and without detailed design information (U.S. Pat. No. 3,493,197). The provided dimensional relationship with leading edges of the horizontal tail being equal to the trailing edges of the wings results in an unnecessarily large translating horizontal tail that divided in two separate tail halves represents a tough design job. Also the proposed blunt trailing edges of the wings with leading edges of the horizontal tail in contact with them form a common surface with detrimental lateral grooves which cause supersonic impact waves by which a considerable amount of possible air drag reduction is lost again.

A method of improving the movable tail unit, as contemplated by the present invention, involves a cutout in the trailing edges of the fixed wings positioned symmetrically with respect to the symmetrical axis of the pair of wings, which dimensionally corresponds to the outer dimensions of the movable horizontal tail. Into this cutout is inserted the forward moved horizontal tail during high-speed flight so that the leading edge of the horizontal tail is positioned in front of the trailing edges of the wings. Also the not engaged landing flaps are inserted into the cutout, and on each side of the aircraft the fixed wing, the horizontal tail, and the landing flap together are forming a compact supersonic air foil profile without any lateral groove. This gives a minimum of impact wave resistance with the corresponding saving of propulsion energy.

Accordingly, it is an object of the present invention to provide a new and advanced movable tail unit for supersonic aircraft, to generally improve the airworthiness and safety of aircraft during low-speed flight and particularly during takeoff and landing, and thus save human lifes during these precarious flight operations.

Another object of the present invention is to provide a new and advanced movable tail unit for supersonic aircraft, to generally reduce the air resistance during high-speed flight, and thus save propulsion energy.

Another object of the present invention is to provide a new and advanced movable tail unit for supersonic transport aircraft.

Another object of the present invention is to provide a new and advanced movable tail unit for supersonic fighter aircraft.

According to the present invention, the foregoing and other objects are attained by providing, in a powered aircraft having a fuselage with a vertical tail on its aft end, a movable horizontal tail, a fixed delta-wing or supercritical wings, a fixed horizontal front plane, and jet engines placed on the bottom side of the wings, the trailing edges of the wings have a common cutout positioned symmetrically with respect to the symmetrical axis of the pair of wings. The dimensions of the cutout correspond to the outer dimensions of the one piece movable horizontal tail, and the horizontal tail is inserted into this cutout during high-speed flight. For low-speed flight the horizontal tail is moved rearwards and away from the wings, and forms a separate horizontal tail in the rear of the aircraft. The rearward and forward movement of the horizontal tail is accomplished by means of rails embodied in the rear bottom part of the fuselage, by rollers engaging said rails and being fastened to the horizontal tail by means of brackets, and by control means; and the rearward and forward movements of the horizontal tail are semi-connected with the engagement and disengagement movements of the landing flaps.

BRIEF DESCRIPTION OF THE DRAWINGS

A more complete appreciation of the invention and many of the attendant advantages thereof will be readily apparent by reference to the following detailed description when considered in connection with the accompanying drawings wherein:

FIG. 1 and FIG. 2 show a supersonic transport aircraft with delta-wings. The left side of FIG. 1 is the upper plan view, the right side of FIG. 1 the bottom plan view, and FIG. 2 the side elevational view of the aircraft. The left side of FIG. 1 and FIG. 2 represent the movable horizontal tail in its forward high-speed flight position, whereas the right side of FIG. 1 represents the movable horizontal tail in its rearward low-speed flight position. In both figures the dash lines show the respective different positions of the movable horizontal tail.

FIG. 3 is a section taken along line A – B of FIG. 1 and of FIG. 5 illustrating the connection between the fixed wing, the movable horizontal tail in its forward high-speed flight position, and the not engaged landing flap; — all these parts forming together a compact supersonic air foil profile without any lateral groove.

FIG. 4 is a section taken along line C – D of FIG. 1 and of FIG. 5 illustrating the parts of FIG. 3, such as the fixed wing, the movable horizontal tail, and the landing flap, but arranged for low-speed flight. The horizontal tail is moved into its rearward position, and the landing flap is engaged.

FIG. 5 and FIG. 6 show a supersonic transport aircraft with supercritical wings. The left side of FIG. 5 is the upper plan view, the right side of FIG. 5 the bottom plan view, and FIG. 6 the side elevational view of the aircraft. The left side of FIG. 5 and the FIG. 6 represent the movable horizontal tail in its forward high-speed flight position, whereas the right side of FIG. 5 represents the movable horizontal tail in its rearward low-speed flight position. In both figures the dash lines show the respective different positions of the movable horizontal tail.

DETAILED DESCRIPTION AND OPERATION

Figure 7:
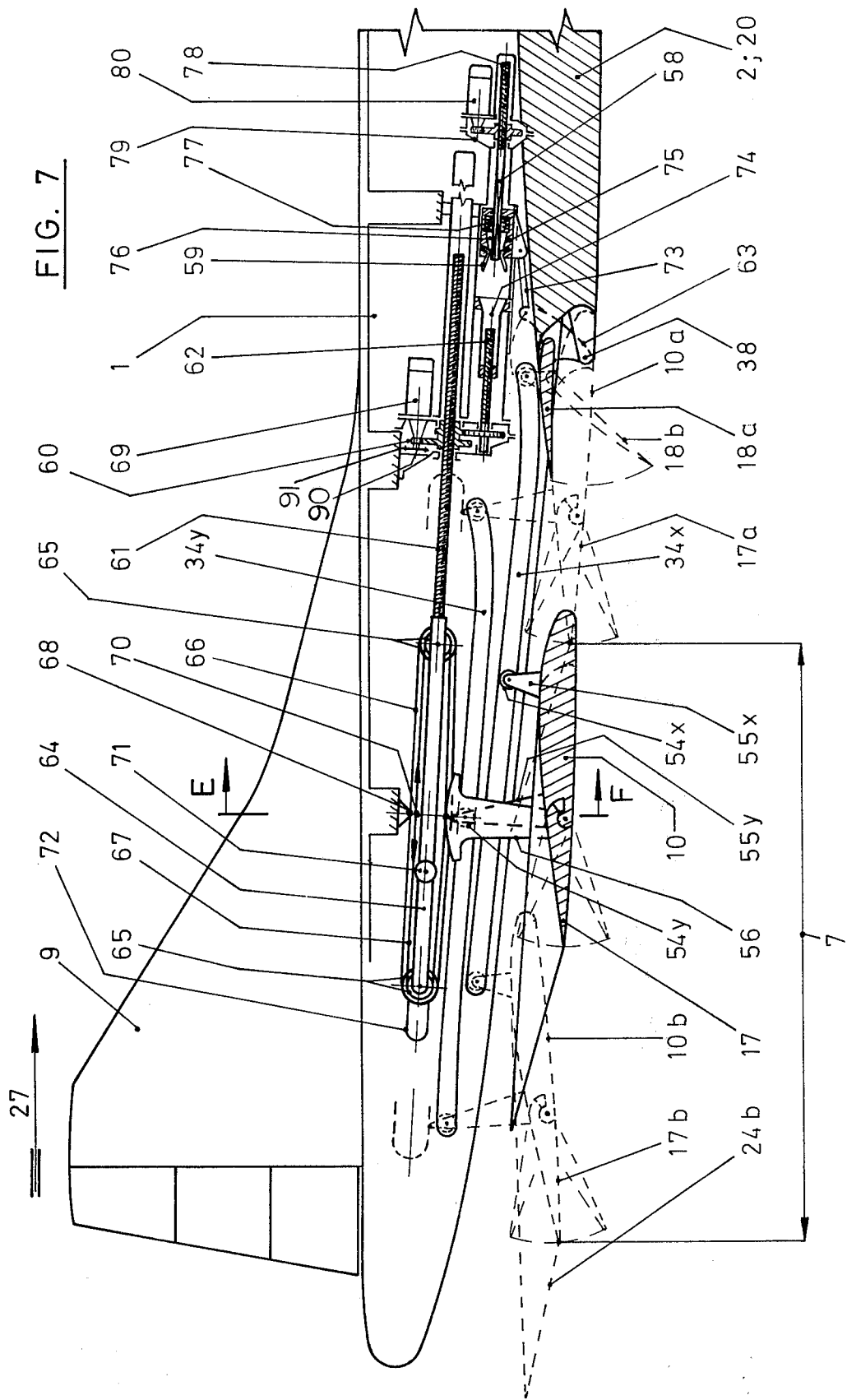
FIG. 7 shows the side elevational view of the rear fuselage of the aircraft according to FIG. 2 and FIG. 6 with removed skin panels and with control means for the rearward and forward movement of the horizontal tail and control means for the engagement and disengagement of the landing flaps. The horizontal tail is shown half-way between its forward and rearward position, and the landing flap is in its disengaged position.

Referring now more particularly to the drawings wherein like reference numerals designate identical parts in each of the views, and more particularly to FIG. 1, FIG. 2, FIG. 5 and FIG. 6, there are:
1. fuselage;
2. fixed delta-wings;
3. jet engines;
7. stroke of the horizontal tail shifting;
9. vertical tail;
10a. horizontal tail in its forward high-speed flight position;
10b. horizontal tail in its rearward low-speed flight position;
16. ailerons;
17a. elevator in its forward high-speed flight position;
17b. elevator in its rearward low-speed flight position;
18a. landing flaps not engaged;
18b. landing flaps engaged;
20. fixed supercritical wings;
21. "spearhead" front plane;
22. front trimming flap;
23. front elevator;
24a. fairing in its forward high-speed flight position;
24b. fairing in its rearward low-speed flight position;
25. transitional radii between the leading edges of the wings and the sides of the fuselage;
30. common cutout in the trailing edges of the pair of wings positioned symmetrically with respect to the symmetrical axis of said pair of wings;
35a. slat not engaged;
35b. slat engaged;
36. slit.

The horizontal tail 10a; 10b has a continuous one piece monocoque construction from one side to the other side of the aircraft, and is arranged transversely under the rear bottom side of the fuselage. The horizontal tail carries brackets with rollers. The rollers are engaging rails inside of the rear fuselage. For low-speed flight the horizontal tail is rolled rearwards into the position 10b, and the horizontal tail is continuously moved away from the engine jet streams, due to the rearward rise of rear bottom side of the fuselage and of the rails of the fuselage. For high-speed flight the horizontal tail is rolled forwards into the position 10a.

The front fuselage carries a horizontal front plane 21 of a spearhead shape comprising a front trimming flap 22 and a front elevator 23. The front plane provides for balancing the increased supersonic nose-heaviness when the horizontal tail is moved ito its forward position 10a, since the supersonic nose-heaviness is not only the result of neutral point rearward shifting, but also of forward movement of the horizontal tail mass. The maximum spread of the horizontal front plane is positioned adjacent the cross-section of the forward fuselage where the pilot's windscreen starts to grow out from the upper skinpanel of the fuselage, which gives a reduction in the common shockwave resistance in accordance with the area rule.

Referring more particularly to FIG. 3 and FIG. 4, there are:
27. direction of flight;
38. fulcrum of landing flap;
39. slot;

The remaining reference numerals are as specified above.

During high-speed flight the fixed wing 2; 20 with slat 35a, the horizontal tail 10a with elevator 17a, and the landing flap 18a together are forming a compact supersonic air foil profile without any lateral groove FIG. 3, and with a minimum of impact wave resistance.

During low-speed flight the horizontal tail 10b with elevator 17b is moved rearwards and gets a positive angle of incidence in relation to the local streamline direction, and the landing flap 18b and slat 35b are engaged FIG. 4.

Figure 8:
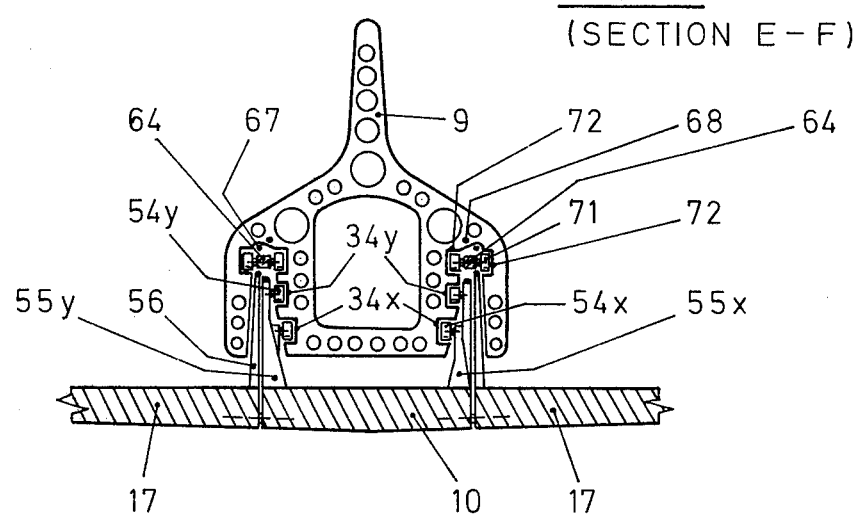
FIG. 8 is a section taken along line E – F of FIG. 7 showing the cross-section through the rear fuselage with further design details of the rails, rollers, and brackets of the horizontal tail and its control means.

Referring more particularly to FIG. 7 and FIG. 8, there are:
10. horizontal tail;
17. elevator;
34x. lower rails;
34y. upper rails;
54x. front rollers, engaging the lower rails 34x;
54y. rear rollers, engaging the upper rails 34y;
55x. front brackets;
55y. rear brackets;
56. control lever of elevator;
58. smooth rod;
59. angular release levers;
60. gearbox;
61. threaded spindle for rearward and forward movement of the horizontal tail;
62. threaded spindle for the semi-connection to the landing flaps;
63. landing flap-lever;
64. tackle-rod of the pulley tackle;
65. pulleys;
66. closed-loop rope for rearward and forward movement of the horizontal tail;
67. closed-loop rope for elevator control;
68. fastening point of rope 66;
69. motor for horizontal tail movement;
70. control input-point for elevator 17;
17. support-rollers on tackle-rod 64;
72. rails for support-rollers 71;
73. rod;
74. sleeve;
75. clamping bush;
76. clamping wedges;
77. spring;
78. threaded spindle attached to the smooth rod 58;
79. gearbox;

80. motor for engagement and disengagement of the landing flaps;
90. Sprockets on the shafts of motors 69;
91. Roller-chain;

The remaining reference numerals are as specified above.

The raisl 34x and 34y are converging towards the rear and are curved, which result in a continuously increasing positive angle of incidence of the horizontal tail during its rearward movement, and in a turning back of this angle of incidence during its forward movement.

The rearward and forward movement of the horizontal tail is on each side of the fuselage accomplished by a pulley tackle with closed-loop ropes that doubles the stroke of the actuating threaded spindle 61. One closed-loop rope 66 effects the movement of the horizontal tail, and is on one side of the tackle fastened to the fuselage structure 68, and on the other side of said tackle attached to one of the rear brackets 55y of the horizontal tail. The second closed-loop rope 67 effects the control of the elevator, and has on one side of the tackle a control input-point 70, and on the other side of the tackle a control output-point which is fastened to the control lever 56 of the elevator. The threaded spindle 61 is actuated by a gearbox 60 and motor 69, and the gearboxes 60 on both sides of the fuselage are connected with each other by means of sprockets 90 and a roller-chain 91.

The semi-connection between the rearward and forward movements of the horizontal tail and the engagement and disengagement movements of the landing flaps is accomplished by clamping connections in the control means for the landing flaps, which will be released by the control means of the horizontal tail, if the horizontal tail would be moved forward although the landing flaps are engaged. This is such operated that on both sides of the fuselage the sleeves 74 press together the protruding arms of the angular release levers 59 by their conical bores, the angular levers pull-off the bushes 75 from the clamping wedges 76, and the clamping wedges release the smooth rods 58; whereupon the sleeves 74 push the bushes 75 along the smooth rods 58 and the landing flaps return into their disengaged position 18a.

This arrangement excludes a collision between the horizontal tail during its forward movement operation and the engaged landing flaps, and an engagement of the landing flaps will be avoided when the horizontal tail is in its forward position.

The control of the motors 69 and 80 is performed by double-throw push-button switches, operated by the pilot, and by limit-switches.

Figure 9:
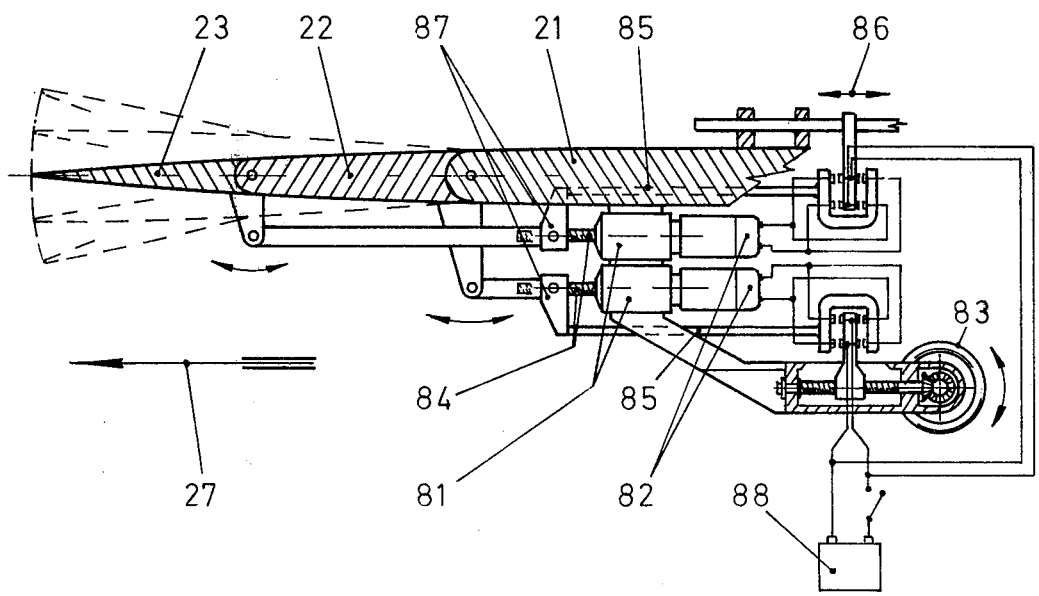
FIG. 9 shows the control means for the front trimming flap and the front elevator of the horizontal front plane. The forward end of the horizontal front plane, the front trimming flap, and the front elevator are shown in the side elevational view.

Referring more particularly to FIG. 9, there are:
81. gearboxes for control of the front trimming flap 22 and of the front elevator 23;
82. motors;
83. hand-wheel for longitudinal high-speed flight trimming;
84. threaded spindles;
85. feedback-rods for the mechanical feedback;
86. control signals for the high-speed flight front elevator 23;
87. nuts;
88. power source;

The remaining reference numerals are as specified above.

The control means for the spearhead shaped front plane consist of two servo-units, one for the front trimming flap 22, and the second one for the front elevator 23. In each servo-unit the motor 82 actuates by the gearbox 81 the threaded spindle 84 which moves the nut 87, and which by a rod and a lever moves the front trimming flap 22 or the front elevator 23. The movements are fedback by the rod 85 to electric contacts attached to the rear end of the rod which control the motor 82.

The control signals for the front trimming flap 22 are manually entered by the trimming hand-wheel 83, whereas the control signals 86 for the front elevator 23 are automatically put-in by an autopilot or are manually entered by the pilot of the aircraft.

The front trimming flap 22 and the front elevator 23 are for takeoff and landing approach inclined downwards to avoid obstruction of the pilot's view.

This description presents preferred embodiments of the invention. Alternations and modifications may occur to those skilled in the art which are included within the scope of the following claims:

I claim:
1. In a supersonic aircraft having a variable geometry horizontal tail which is movable in longitudinal direction of aircraft and which for low-speed flight and particularly for takeoff and landing is moved to a rearward position but which for high-speed flight is moved to a forward position (FIG. 1; FIG. 2; FIG. 5 and FIG. 6), the improvement comprising:

a pair of wings of invariable aspect ratio and of deep profile chords at the roots of said wings with decrease in the profile chords towards the tips of said wings (2; 20) having in the trailing edges a common cutout (30) positioned symmetrically with respect to the symmetrical axis of said pair of wings,
 a. the said cutout (30) accommodating landing flaps (18a; 18b) positioned along the upper trailing edge of said cutout,
 b. the said wings (2; 20) including ailerons (16) positioned along the trailing edges of said wings, but outside of said cutout (30),
 c. the said wings (2; 20) including slats (35a; 35b) positioned along the leading edges of said wings,
a fuselage (1) positioned on said symmetrical axis of said pair of wings and substantially on the upper side of said wings carrying a fixed vertical tail (9) on its aft end,
 a. the rear bottom side of said fuselage being adjacent to the upper trailing edge of said cutout (30),
 b. the rear bottom side of said fuselage being risen towards the rear,
 c. the rear bottom side of said fuselage embodying two lower rails (34x), one on each side of the fuselage, and two upper rails (34y), one on each side of the fuselage, for the rearward and forward movement of the horizontal tail,
 d. the rear fuselage embodying control means for the rearward and forward movement of the horizontal tail, and control means for the engagement and disengagement of said landing flaps,
 e. the front fuselage carrying a horizontal front plane (21) of a spearhead shape, comprising a front trimming flap (22) and a front elevator (23), f. the front fuselage embodying control means for said front trimming flap and for said front elevator, at least two jet engines placed on the bottom side of said wings, a horizontal tail (10a; 10b) in a continuous one piece monocoque construction from one side to the other side of the aircraft arranged transversally under the rear bottom side of said fuselage,
  a. the said horizontal tail having outer dimensions that correspond to the dimensions of said cutout (30),
  b. the said horizontal tail having longitudinal control elevators (17a; 17b) positioned along the trailing edge of said horizontal tail, but being omitted in the engine cowl-areas and in the fuselage area,
  c. the said horizontal tail carrying on its upper surface two front brackets (55x) with front rollers (54x) engaging said two lower rails (34x), and two rear brackets (55y) with rear rollers (54y) engaging said two upper rails (34y) (FIG. 7) and said rollers are rolling along said rails when said horizontal tail is moved rearwards or forwards,
  d. the said horizontal tail carrying on its upper surface a fairing (24a; 24b) of a longitudinal shape which is joined in an airflow suitable manner to said fuselage particularly during high-speed flight (24a), the said horizontal tail being rolled forwards into the position (10a) and inserted into said cutout (30) during high-speed flight and having in this position its leading edge adjacent to the front edge of said cutout so that the leading edge of said horizontal tail is positioned in front of the trailing edges of said wings and said horizontal tail forms together with said wings a combined supporting and stabilizing surface assembly, and the said horizontal tail being rolled rearwards and away from said wings for low-speed flight and placed in its rear position (10b) to form a separate horizontal tail in the rear of said aircraft.

2. The aircraft of claim 1 wherein said insertion of said horizontal tail into said cutout (30) during high-speed flight is characterized by placing said horizontal tail (10a) near the bottom side of said cutout (30) whereas the not engaged landing flaps (18a) are also inserted into said cutout (30) and placed near the upper side of said cutout, and said landing flaps are lying flat above said horizontal tail (FIG. 1; FIG. 2; FIG. 3; FIG. 5 and FIG. 6) with the trailing edges of said landing flaps positioned in front of the leading edges of said elevators (17a), and said horizontal tail has a positive camber whereas its chord is negatively inclined to the chord of said wings, and said wings, said horizontal tail, and said landing flaps together are forming compact supersonic air foil profiles without any lateral grooves, and with a minimum of air impact wave resistance.

3. The aircraft of claim 1 wherein said wings have a delta-shape (FIG. 1) with leading edges swept outwardly and rearwardly with respect to the adjacent sides of said fuselage, and with trailing edges swept outwardly and for instance slightly forwardly with respect to the adjacent sides of said fuselage.

4. The aircraft of claim 1 wherein said wings are supercritical wings (20) (FIG. 5) with leading edges swept outwardly and rearwardly with respect to the adjacent sides of said fuselage and with large transitional radii (25) between said leading edges and said adjacent sides of said fuselage, and with trailing edges also swept outwardly and rearwardly with respect to the adjacent sides of said fuselage.

5. The aircraft of claim 1 wherein said horizontal front plane (21) has such a shape that starting from the forward plane tip the leading edges on both plane sides are swept outwardly and rearwardly up to the maximum spread of the front plane whereupon begin the trailing edges of the front plane which are extending inwardly and rearwardly with respect to the adjacent sides of said fuselage up to the points where the trailing edges meet the fuselage sides, whilst the fuselage nose gradually grows out from the upper and bottom surfaces of said front plane, and that said maximum spread of said front plane is positioned adjacent the cross-section of said forward fuselage where the pilot's windscreen starts to grow out from the upper skin-panel of the fuselage, which gives a reduction in the common air impact wave resistance in accordance with the area rule.

6. The aircraft of claim 1 wherein said horizontal tail during said rearward movement is getting a continuously increasing positive angle of incidence in relation to the local streamline direction to produce additional lift during low-speed flight (FIG. 4 and FIG. 7), which is accomplished by a convergence of said lower rails (34x) and said upper rails (34y) in their relative distance towards the rear of the fuselage, and by a curvature of said rails being at their front ends bent upwards and especially said upper rails (34y) being at their rear ends bent downwards, and which positive angle of incidence of said horizontal tail is continuously turned back during said forward movement of said horizontal tail.

7. The aircraft of claim 1 wherein said control means for said rearward and forward movement of said horizontal tail are on each side of said fuselage composed of a gearbox (60) with a motor (69) (FIG. 7) which put a threaded spindle (61) into a translatory movement whilst said spindle is attached to a pulley tackle which doubles the stroke of the threaded spindle and which consists of a tackle-rod (64), four pulleys (65), and two closed-loop ropes, of which one rope (66) effects said movements of said horizontal tail being on one side of said tackle fastened to the fuselage structure (68) and one the other side of said tackle attached to one of said rear brackets (55y) of said horizontal tail, whereas the second rope (67) effects the control of said elevator (17a; 17b) having on one side of said tackle a control input-point (70) and on the other side of said tackle a control output-point that is fastened to the control lever (56) of said elevator, and of the two said gearboxes (60) (only one is shown) on both sides of the fuselage are connected with each other by means of a roller-chain (91) to attain a simultaneous movement of the two threaded spindles (61) and of the two pulley tackles on both sides of the fuselage.

8. The aircraft of claim 1 wherein said rearward and forward movements of said horizontal tail are semi-connected with the engagement and disengagement movements of said landing flaps (FIG. 4 and FIG. 7) which is accomplished by a mechanical connection between the two said control means and by a releasable clamping connection in said control means for said landing flaps, and said control means for said landing flaps are on each side of the fuselage composed of a gearbox (79) with a motor (80) which put a threaded spindle (78) into a translatory movement whilst said spindle is attached to a smooth rod (58) which by means of clamping wedges (76) transmits its movement to a bush (75) wherefrom by a rod (73) and a lever (63) said movement is transmitted to said landing flap (18a; 18b), but said clamping connection will be released by the sleeve (74), which is put into a translatory movement by a second threaded spindle (62) driven by said horizontal tail control means, if said horizontal tail would be moved forward although said landing flap is engaged, which is such operated that said sleeve (74) presses together the protruding arms of the angular release levers (59) by its conical bore, said angular levers pull-off said bush (75) from said clamping wedges (76), and said clamping wedges release said smooth rod (58), whereupon said sleeve (74) pushes said bush (75) along said smooth rod (58) and said landing flap returns into its disengaged position (18a), whereby a collision between said horizontal tail during its forward movement operation and said engaged landing flaps will be excluded, and also an engagement of said landing flaps will be avoided when said horizontal tail is in its forward position.

9. The aircraft of claim 1 wherein said control means for said horizontal front plane (21) consist of two servo-units of which one unit adjustes said front trimming flap (22) and the second unit actuates said front elevator (23), and each servo-unit is composed of a motor (82) and a gearbox (81) which by a threaded spindle (84) put a nut (87) into a translatory movement whilst said nut is connected by a rod and a lever with said front trimming flap (22) or with said front elevator (23), and said nut puts also a feedback-rod (85) into translatory movements together with electric contacts on its rear end which control said motor (82) wherein said control signals for said front trimming flap (22) are for instance manually entered by a trimming handwheel (83) whereas the control signals (86) for said front elevator (23) are entered by a separate control means.

10. The aircraft of claim 1 wherein said front trimming flap (22) and said front elevator (23) are downwardly inclined during takeoff and landing approach to avoid obstruction of the pilot's view.

11. The aircraft of claim 1 wherein said rearward movement of said horizontal tail is coupled with a continuous movement away of said horizontal tail from the engine jet streams, which is accomplished by said rearward rise of said rear bottom side of said fuselage and by the corresponding rise of said rails (34x and 34y).

* * * * *